United States Patent [19]

Houldsworth

[11] Patent Number: 5,484,206
[45] Date of Patent: Jan. 16, 1996

[54] METHOD AND APPARATUS FOR SENSING A COLD JUNCTION TEMPERATURE

[76] Inventor: John Houldsworth, 11622 Old Brookville Ct., Reston, Va. 22094

[21] Appl. No.: 174,023

[22] Filed: Dec. 28, 1993

[51] Int. Cl.⁶ .............................. G01K 7/13; G01K 7/01; G01K 1/16
[52] U.S. Cl. .................. 374/181; 374/134; 374/178; 374/112; 374/113
[58] Field of Search .................. 374/181, 112, 374/113, 178, 179, 134; 136/224

[56] References Cited

U.S. PATENT DOCUMENTS

| | | |
|---|---|---|
| Re. 30,735 | 9/1981 | Ihlenfeldt et al. . |
| 3,067,577 | 12/1962 | Dew ........................ 374/112 |
| 3,112,880 | 12/1963 | Pollock .................... 374/112 |
| 3,916,691 | 11/1975 | Hollander et al. . |
| 3,921,453 | 11/1975 | Platzer, Jr. . |
| 4,031,355 | 6/1977 | Leonik, Jr. . |
| 4,120,201 | 10/1978 | Wargo ...................... 374/181 |
| 4,130,019 | 12/1978 | Nitschke . |
| 4,133,700 | 1/1979 | Hollander et al. ......... 374/181 |
| 4,147,061 | 4/1979 | Wester et al. . |
| 4,157,663 | 6/1979 | Ihlenfeldt et al. ......... 374/181 |
| 4,221,923 | 9/1980 | Nagao et al. .............. 136/222 |
| 4,315,243 | 2/1982 | Calvert, Sr. .............. 374/113 |
| 4,372,690 | 2/1983 | Berman et al. ............. 374/29 |
| 4,453,552 | 6/1984 | Ensign ..................... 374/181 |
| 4,456,390 | 6/1984 | Junkert et al. ............ 374/128 |
| 4,482,261 | 11/1984 | Dewey et al. ............. 374/181 |
| 4,488,824 | 12/1984 | Salem ...................... 374/181 |
| 4,588,307 | 5/1986 | Palti ....................... 128/736 |
| 4,590,472 | 5/1986 | Benson et al. ............ 374/133 |
| 4,623,266 | 11/1986 | Kielb ....................... 374/181 |
| 4,718,777 | 1/1988 | Mydynski et al. ......... 374/181 |
| 4,746,223 | 5/1988 | Miyata et al. ............. 374/103 |
| 4,804,272 | 2/1989 | Schmitz ................... 374/181 |
| 4,841,543 | 6/1989 | Dittmar et al. ............ 374/44 |
| 4,863,283 | 9/1989 | Falk ........................ 374/181 |
| 4,936,690 | 6/1990 | Goetzinger ............... 374/181 |
| 4,990,193 | 2/1991 | Kimura .................... 136/201 |
| 5,018,872 | 5/1991 | Suszynski et al. ........ 374/133 |
| 5,038,303 | 8/1991 | Kimura .................... 364/557 |
| 5,056,929 | 10/1991 | Watanabe et al. ........ 374/181 |
| 5,066,140 | 11/1991 | Beran ...................... 374/134 |
| 5,088,835 | 2/1992 | Shigezawa et al. ....... 374/181 |
| 5,104,234 | 4/1992 | Falk et al. ................ 374/140 |
| 5,161,892 | 11/1992 | Shigezawa et al. ....... 374/179 |
| 5,161,893 | 11/1992 | Shigezawa et al. ....... 374/181 |
| 5,163,755 | 11/1992 | Shimomura et al. ....... 374/181 |
| 5,184,894 | 2/1993 | Falk et al. ................ 374/140 |

FOREIGN PATENT DOCUMENTS

0041570   3/1977   Japan .................... 374/181

*Primary Examiner*—Diego F. F. Gutierrez

[57] ABSTRACT

An improved method and apparatus for sensing a cold junction temperature, wherein two sensors are located near the cold junction temperature, the temperatures at the two sensors are measured, the heat flow between the two sensors and one of the two sensors and the cold junction is constrained to be equal, and the thermal impedances between each of the two sensors and the cold junction is maintained constant. The cold junction temperature is a weighted difference of the two temperatures at the two sensors and the weighting factor depends on the ratio of the thermal impedance between the two sensors and the thermal impedance between the first sensor and the cold junction.

33 Claims, 5 Drawing Sheets

METHOD AND APPARATUS FOR SENSING A COLD JUNCTION TEMPERATURE

BACKGROUND OF THE INVENTION

Figures 1, 2:
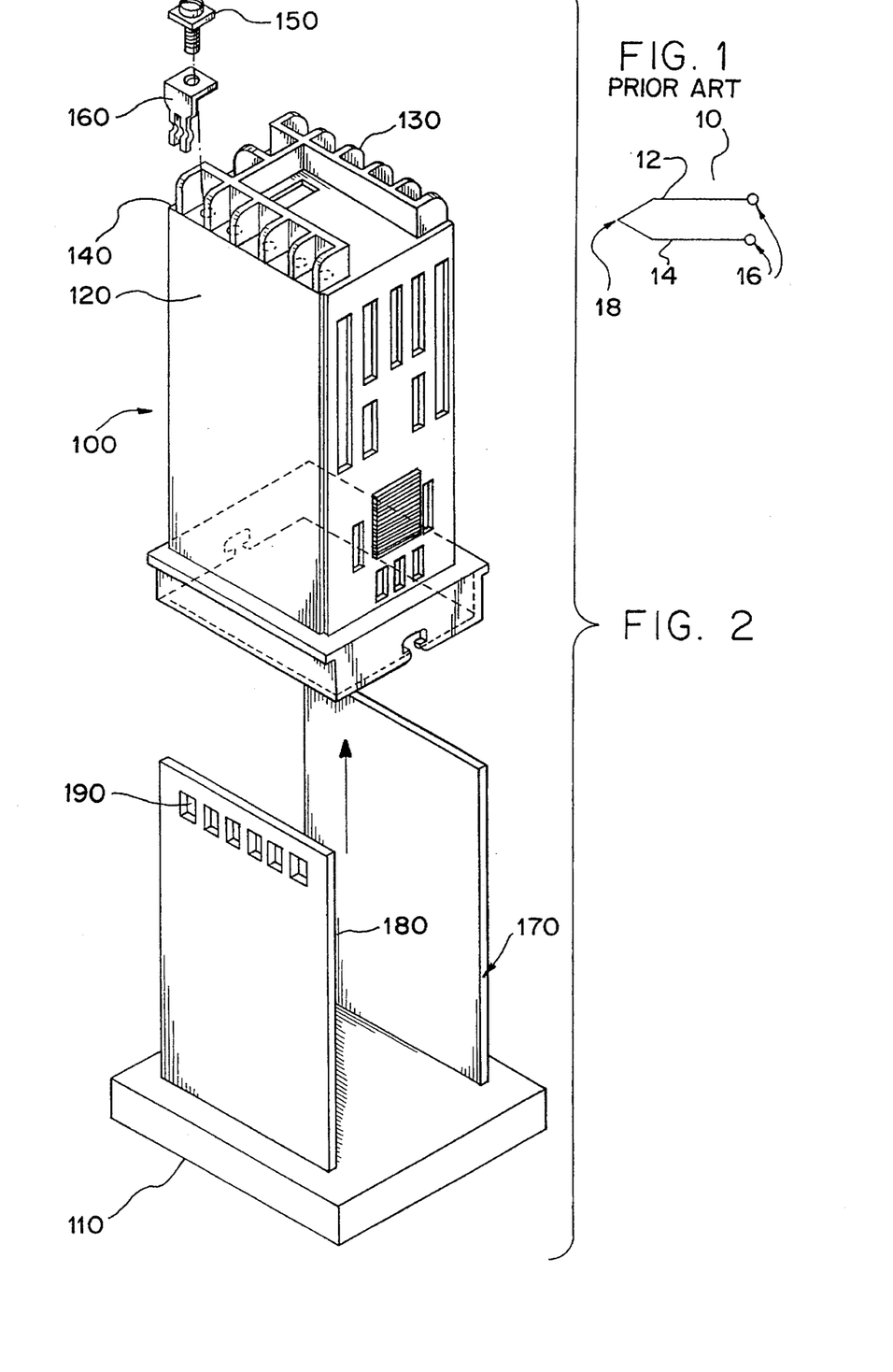
FIG. 1 illustrates a conventional thermocouple.
FIG. 2 illustrates a housing for a temperature controller which utilizes the method of the present application.

As illustrated in FIG. 1, a thermocouple 10 is composed of two different elements 12 and 14 and a pair of screw terminals 16. In order to accurately measure the temperature at the tip 18 of the thermocouple 10, it is also necessary to accurately measure the cold junction temperature at the screw terminals 16. A common problem is that a temperature sensor for measuring the cold junction temperature at the screw terminals 16 cannot be collocated with the screw terminals due to space constraints. Further, if the screw terminals are part of PCB electronics which are removable to facilitate replacement in case of failure, the temperature sensor for measuring the cold junction temperature can not be collocated with the screw terminals 16.

In a cold junction arrangement, where the cold junction temperature sensor is PCB-mounted on a measurement PCB, the ability of the sensor to acquire the actual cold junction temperature at the screw terminals via an edge connector is dominated by a high thermal impedance of the connector region.. Relative magnitudes of other thermal paths and the total internal power dissipation and its variability will control the size of the cold junction temperature error. The most significant of these other paths is not the PCB trace or air convection, but rather the conduction through and along the PCB itself.

As discussed above, when measuring the cold junction temperature, it is often not possible to locate the sensing element precisely at the point of interest. Assuming there is a finite thermal impedance between the point of interest and the location of the sensing element, a temperature error will result whenever there is a flow of heat between these two points. This heat flow, which is equal to a difference in temperature between the point of interest and the location of the sensing element divided by the finite thermal impedance therebetween, may be internally generated within the PCB electronics or simply be due to ambient changes in temperature resulting in a flow of heat into or out of the body of the device.

Previous solutions to the problem of differing temperatures between the location of the sensing element and the location of the point of interest focused on minimizing the impedance or minimizing the heat flow, and then accepting the residual error, which is sometimes accounted for by a fixed offset adjustment. One conventional solution is to locate the sensor as close as possible to the point of interest, however, heat generated from the electronics generally causes a significant temperature difference between the temperature at the sensor and the temperature at the screw terminals.

Other conventional solutions have attempted to compensate for this temperature difference by assuming the temperature difference to be a fixed predetermined value (after a warm-up period). However, these compensation techniques are inaccurate in non-uniform temperature applications, namely, where the heat flow between the sensing point and the screw terminals is variable. In addition, these compensation techniques have a tendency to overcompensate during start-up. In contrast, the present invention accepts the fact that there will be a temperature difference due to variable heat flow, measures the variable heat flow, and corrects for this variable heat flow, in order to eliminate the temperature error under all conditions.

In particular, the method and apparatus of the present invention utilizes two sensors, neither of which are collocated with the screw terminals, measures a temperature at each of the two sensors, ensures that the heat flow between the first and second sensors and the heat flow between the first sensor and the screw terminals are equal, and determines the temperature at the screw terminals using a weighted difference of the temperatures at the first and second sensors, wherein the weighting factor is determined by the ratio of the thermal impedance between the first and second sensors and the screw terminals. The only assumption made in using this technique is that the thermal impedance between the two sensors and the thermal impedance between the second of the two sensors and the screw terminals are reasonably stable,

SUMMARY OF THE INVENTION

One object of the present invention is to provide a method and apparatus for estimating a cold junction temperature.

It is further an object of the present invention is to provide a method and apparatus for sensing a cold junction temperature at a screw terminal of a terminal block of an electronic instrument.

It is further an object of the present invention to provide a method for estimating a cold junction temperature at a screw terminal of a terminal block of an electronic instrument.

It is another object of the present invention to provide a method for estimating the temperature at the screw terminal where the screw terminal is inaccessible for a direct measurement.

It is further an object of the present invention to provide a method and apparatus for estimating a temperature at a selected position.

It is another object of the present invention to provide a method and apparatus for estimating a temperature at a selected position, where the selected position is a position which is inaccessible for a direct measurement.

It is another object of the present invention to provide a method and apparatus for estimating the temperature at a selected position, where the selected position is a cold junction of electronic instrumentation.

It is another object of the present invention to provide a method and apparatus for estimating a temperature at a selected position, where the selected position is a screw terminal, located on a terminal block associated with plug-in electronics.

It is another object of the present invention to provide a method and apparatus for estimating the temperature at a selected position, wherein the selected position is within a vessel.

It is another object of the present invention to provide a method and apparatus for estimating the temperature at a selected position, wherein the selected position is on an external surface of a probe or sheath.

It is another object of the present invention to provide a method and apparatus for estimating the temperature at a selected position, which includes one or more thermocouple junctions at each of two positions connected in series so as to form a composite thermopile which acts as a single phantom thermocouple junction at the selected position.

Some of these objects of the present application are fulfilled by providing an apparatus for estimating a cold junction temperature at a screw clamp of a terminal block of an electronic instrument, said electronic instrument including at least one plugin printed circuit board, having a connector for connecting said at least one plug-in printed circuit board to said terminal block, said apparatus comprising:

insulating means for insulating said connector and a portion of said at least one printed circuit board to constraint a heat flow across said at least one printed circuit board in a first direction;

first sensor means, located a first distance from said screw clamp in the first direction, for measuring a first temperature;

second sensor means, located a second distance from said screw clamp in the first direction, for measuring a second temperature; and temperature estimating means for dynamically estimating a temperature at said screw clamp from a weighted difference of said first temperature and said second temperature.

Other objects of the present application are fulfilled by providing an apparatus for estimating a temperature at a desired position comprising:

insulating means for insulating the desired position to constrain a heat flow in a first direction;

first sensor means, located a first distance from the desired position in the first direction, for measuring a first temperature;

second sensor means, located a second distance from the desired position in the first direction, for measuring a second temperature; and temperature estimating means for dynamically estimating the temperature at the desired position from a weighted difference of the first temperature and the second temperature.

Still other objects of the present invention are fulfilled by providing a method for estimating a cold junction temperature at a screw clamp of a terminal block of an electronic instrument, the electronic instrument including at least one plug-in printed circuit board, having a connector for connecting the at least one plug-in printed circuit board to the terminal block, said method comprising the steps of:

(a) insulating the connector and a portion of the printed circuit board to constrain a heat flow across the at least one plug-in printed circuit board in a first direction;

(b) measuring a first temperature at a first distance from the screw clamp in the first direction;

(c) measuring a second temperature at a second distance from the screw clamp in the first direction; and (d) dynamically estimating a temperature at the screw clamp from a weighted difference of the first temperature and the second temperature.

Still other objects of the present invention are fulfilled by providing a method for estimating a temperature at a selected position comprising the steps of:

(a) insulating the selected position to constrain a heat flow in a first direction;

(b) measuring a first temperature, at a first distance from the selected position in the first direction;

(c) measuring a second temperature, at a second distance from the selected position in the first direction; and (d) dynamically estimating the temperature at the selected position from a weighted difference of the first temperature and the second temperature.

These and other objects of the present invention will become more readily apparent from the detailed description given hereafter. However, it should be understood that a detailed description and specific examples, while indicating preferred embodiments of the invention, are given by way of illustration only, since various changes and modifications within the spirit and scope of the invention will become apparent to those skilled in the are from this description.

BRIEF DESCRIPTION OF THE DRAWINGS

The present invention will become more fully understood from the detailed description given herein below and the accompanying drawings which are given by way of illustration only and thus are not limitlye of the present invention and wherein.

DETAILED DESCRIPTION OF THE PREFERRED EMBODIMENT

A housing 100 for a temperature controller which utilizes the method and apparatus for sensing a cold junction temperature, is illustrated in FIG. 2. The housing 100 includes a front panel 110, which is connected to internal PCBs and an outer sleeve 120, which slides over the PCBs and locks with the front panel 110. The outer sleeve 120 further includes an insulating plastic molding 130, which insulates a plurality of screw terminals 140 attached to the back of the outer sleeve 120. Each of the screw terminals 140 includes a screw 150 and an edge connector 160, as illustrated in FIG. 2. The edge connectors 160 contact edge pads (illustrated in FIG. 3(b) as element 190), located on a rear end of the PCBs, in order to make an electrical contact between the PCBs and the screw terminals 140.

Figure 3A:
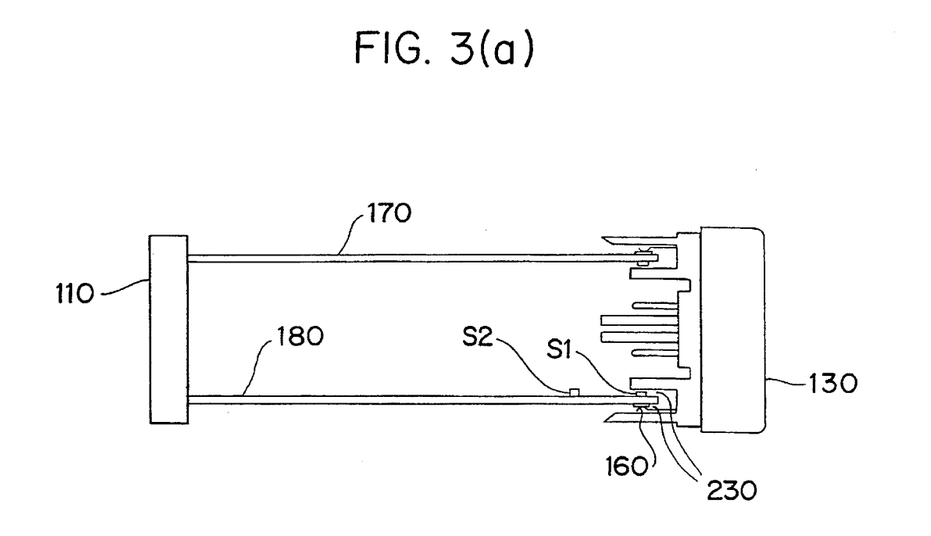
FIGS. 3(a) and 3(b) illustrates the apparatus of the present application in a preferred embodiment.
Figure 3B:
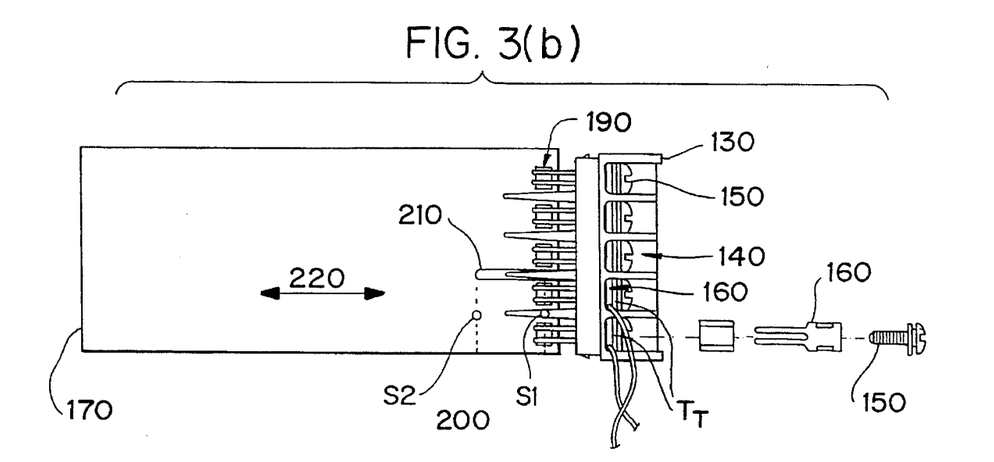

In the preferred embodiment, further illustrated in FIG. 3(a) and 3(b), the cold junction temperature $T_T$ is at screw terminal 140 of the outer sleeve 120, wherein PCBs 170 and 180 are physically and electronically connected to the front panel 110, and physically and electronically connected to the screw terminals 140, via the edge connector 160. If the PCBs 170 and 180 are removable to facilitate replacement in case of failure or if there is insufficient space, it is infeasible to locate a temperature sensor to measure the cold junction temperature $T_T$ colocated with the screw terminals 140. In a preferred embodiment, the cold junction temperature sensor S1 is located near the edge connector pads 190, and both sides of the PCB 170 in the connector region are insulated from possible heat sources by making the edge connector pad 190 at one end of the edge connector 160 and the cold junction temperature sensor S1 as small as possible and using trapped air layers 230 as an insulator. Next, a notional "guard band" 200 is formed at the cold junction temperature sensor S2 between the edge connector pad 190 of the edge connector 160 and internal heat sources, and by cutting a slot 210 in the PCB 170, the heat flow path is constrained between the guard band 200 and the edge connector pad 190. The cold junction temperature sensor S2 is located near the other end of the slot 210. The formation of the slot 210 constrains the heat flow to one axis 220 of the PCB 170.

Figure 4:
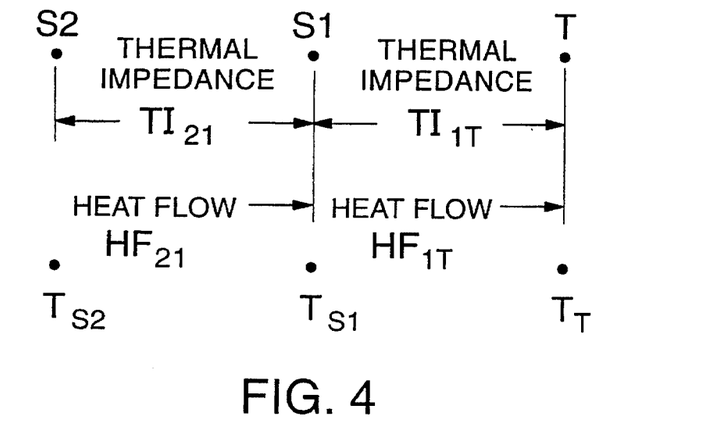
FIG. 4 illustrates the relative positions of two cold function temperature sensors and the screw terminal in a preferred embodiment of the present application.

The positions of the cold junction temperature sensor S2, the cold junction temperature sensor S1, and the screw terminal T are illustrated in FIG. 4. The temperature at the cold junction temperature sensor S2 is represented as $T_{S2}$, the temperature of the cold junction temperature sensor S1 is represented by $T_{S1}$ and the cold junction temperature is represented by $T_T$. As illustrated in FIG. 4, the thermal impedance between the cold junction temperature sensor S2 and the cold junction temperature sensor S1 is $TI_{21}$ and the thermal impedance between the cold junction temperature sensor S1 and the cold junction T is $TI_{1T}$. Still further, the heat flow between the cold junction temperature S2 and the cold junction temperature sensor S1 is represented by $HF_{21}$ and the heat flow from the cold junction temperature sensor S1 to the cold junction T is represented as $HF_{1T}$. The above-identified variables are related by the following equations:

$$HF_{1T} = \frac{T_{S1} - T_T}{TI_{1T}}$$

$$HF_{21} = \frac{T_{S2} - T_{S1}}{TI_{21}}$$

The slot 210 cut in the PCB 170 ensures that the heat flow $HF_{21}$ and $HF_{1T}$ are equal. Therefore, $$\frac{T_{S1} - T_T}{TI_{1T}} = \frac{T_{S2} - T_{S1}}{TI_{21}}$$

where the cold junction temperature $T_T$ is the unknown variable. Therefore, solving for $T_T$ results in the following equation;

$$T_T = T_{S1} - \frac{TI_{1T}}{TI_{21}}(T_{S2} - T_{S1})$$

Figure 8:
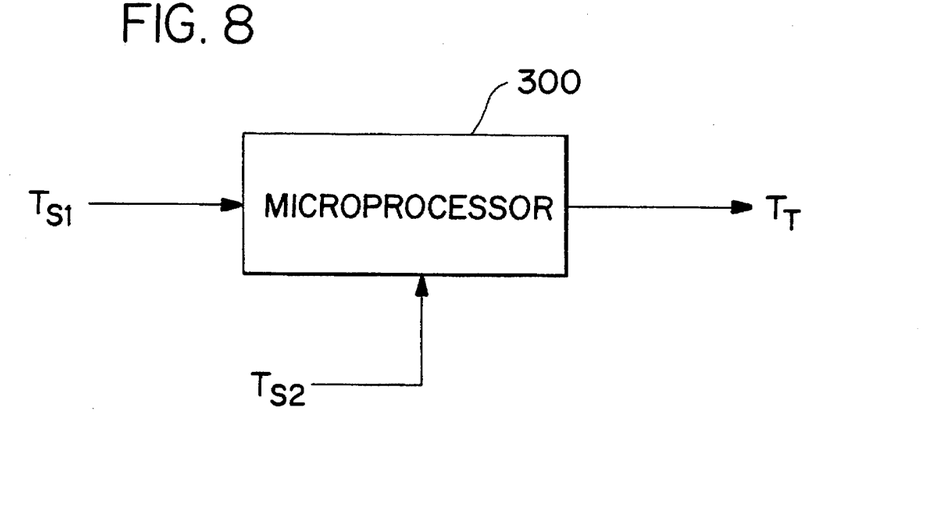
FIG. 8 illustrates a microprocessor for performing a weighted difference of a first temperature and a second temperature.

The temperatures $T_{S2}$ and $T_{S1}$ are measured. As a result, the cold junction temperature $T_T$ is a weighted difference of the two temperatures $T_{S2}$ and $T_{S1}$ measured by the cold junction temperature sensors S1 and S2 and the weighting factor depends on the ratio of the thermal impedances, $TI_{1T}$ and $TI_{21}$. A microprocessor 300 for performing the weighted difference is illustrated in FIG. 8.

As a result, the method and apparatus of the present application improves cold junction temperature sensing by simulating a single "phantom" sensor positioned at the point of interest, namely, the cold junction T, in order to obtain an accurate temperature $T_T$ at that point, when it is physically impossible to locate a sensor at the cold junction.

Figures 5, 6:
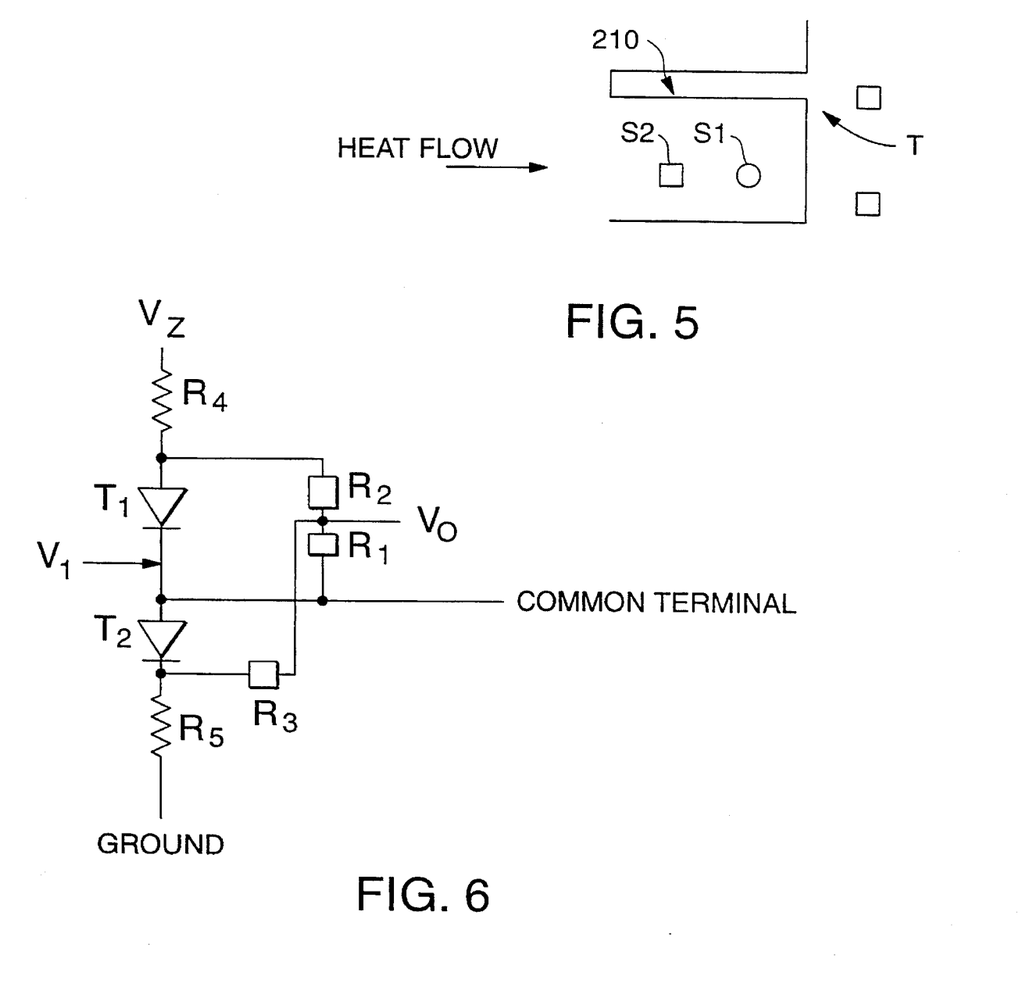
FIG. 5 illustrates two sensors placed on a printed circuit board, in a preferred embodiment of the present application.
FIG. 6 illustrates a schematic circuit utilizing two diodes as temperature sensors.

Two thirty minute tests were run in order to confirm the accuracy of the apparatus and method of the present application. One of the thirty minute tests was run with normal internal dissipation and the other was run with two watts extra internal dissipation. Assuming that the thermal impedances between T, S1, and S2 do not change, the temperature at T can be predicted utilizing the method and apparatus of the present application, as illustrated in FIG. 5. After thirty minutes, test data revealed that the $\Delta°$ F. between T and S1 is 1.07 times that between S1 and S2 with either normal or two watts extra internal dissipation. This implies that the thermal impedances between T and S1 is 1.07 times the thermal impedance between S1 and S2. Therefore, $$T_T = T_{S1} - 1.07(T_{S2} - T_{S1}).$$

A schematic circuit of the apparatus of FIGS. 3(*a*) and 3(*b*) utilizing two temperature sensors is illustrated in FIG. 6. A first diode T1 is installed at S1 and a second diode T2 is installed at S2. The diodes are connected as illustrated in FIG. 6, so that their temperature coefficients may be subtracted. The voltage across each diode depends on the temperature of that diode. The values of resistors R4 and R5 are selected in order to get 0.25 milliamps of current through the diodes T1 and T2. In a preferred embodiment, V2 equals five volts and R4 equals 10kΩ and R5 equals 1.2kΩ. The values of resistors R2 and R3 determine the weighted difference and resistor R1 is utilized to scale the weighted difference in order to attain a desired overall gain. The sensor gain applied to the first diode to $V_o$ is 0.128 (assuming R2 equals 15kΩ and R1 equals 2.2kΩ). From the previously derived formula, the terminal temperature $T_T = 2.07T_{S1} - 1.07T_{S2}$ The ratio of 2.07 divided by 1.07 indicates that the gain applied to the first diode should be 1.93 items the gain applied to the second diode. Since the original gain of 0.128 now equals the gain for T1 minus the gain for T2, the T1 gain equals 0.265 and T2 gain equals 0.137. The following equations can be written to solve for R1 and R3, if R2 is known (15kΩ):

$T_1$ gain: G1=(R1*R3)/(R1*R3+R2*R1+R2*R3)

$T_2$ gain: G2=−(R1*R2)/(R1*R2+R2*R3,R3,R1).

Solving for R1 and R3:

R1=R3*G3/(1−G1−G2)=6.6kΩ

R3=G2*R2/G3=28.9kΩ

The above resistors were installed and the apparatus was recalibrated. With a 32° F. input on a type J thermocouple, a thirty minute warm-up test was performed which resulted in 1° F. drift of the measured value (32°–33° F.). Next, the ambient temperature was raised from 73° to 122° F. which resulted in a 1° F. drift of the measured value after thirty minutes (33°–32° F.). The unit was then quickly placed in a 73° F. ambient environment with moving air directed onto the rear terminals. The measured value was observed to change 2° F. before stabilizing (32°–34°–32° F.). In a subsequent test, a 1° F. change was observed when a unit at 122° F. was transferred to a 73° F. environment of still air (32°–33° F.). No more than a 2° F. total measured value drift was observed for all of the above tests which is a large improvement over a standard unit where a greater than 4° F. drift would result from warm-up alone. The apparatus of the present application shows much more immunity to both internal an external temperature changes.

Figure 9:
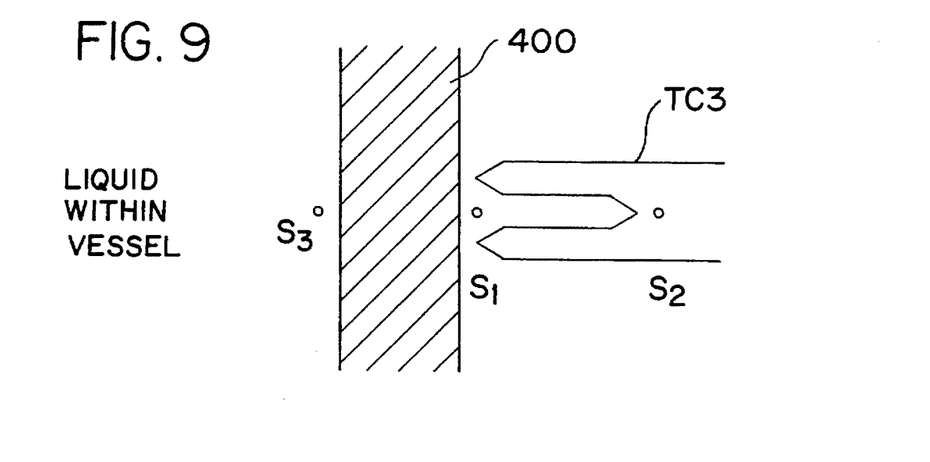
FIG. 9 illustrates a vessel in which the apparatus and method of the present application may be used.
Figure 10:
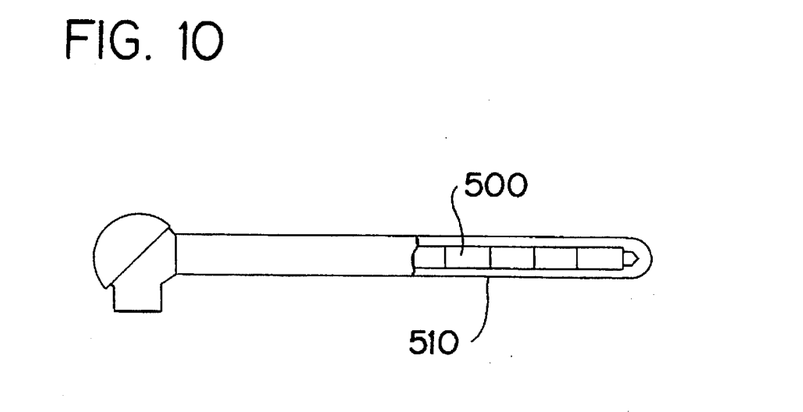
FIG. 10 illustrates a temperature probe enclosed in a sheath in which the apparatus and method of the present application may also be used.

Further, the method and apparatus of the present application may be utilized to improve any temperature sensing at a position where it is not possible locate the sensor precisely at the point of interest, where thermal impedances are stable, but actual heat flow is not. Other potential applications of the method and apparatus of the present application include the ability to acquire a temperature through the wall of a vessel or container 400, illustrated in FIG. 9, which can not be perfectly lagged or is even being heated through the wall itself from the outside and for eliminating or reducing the settling time of a temperature probe 500 when enclosed in a sheath 510, illustrated in FIG. 10, or where there is significant heat and impedance involved.

Figure 7:
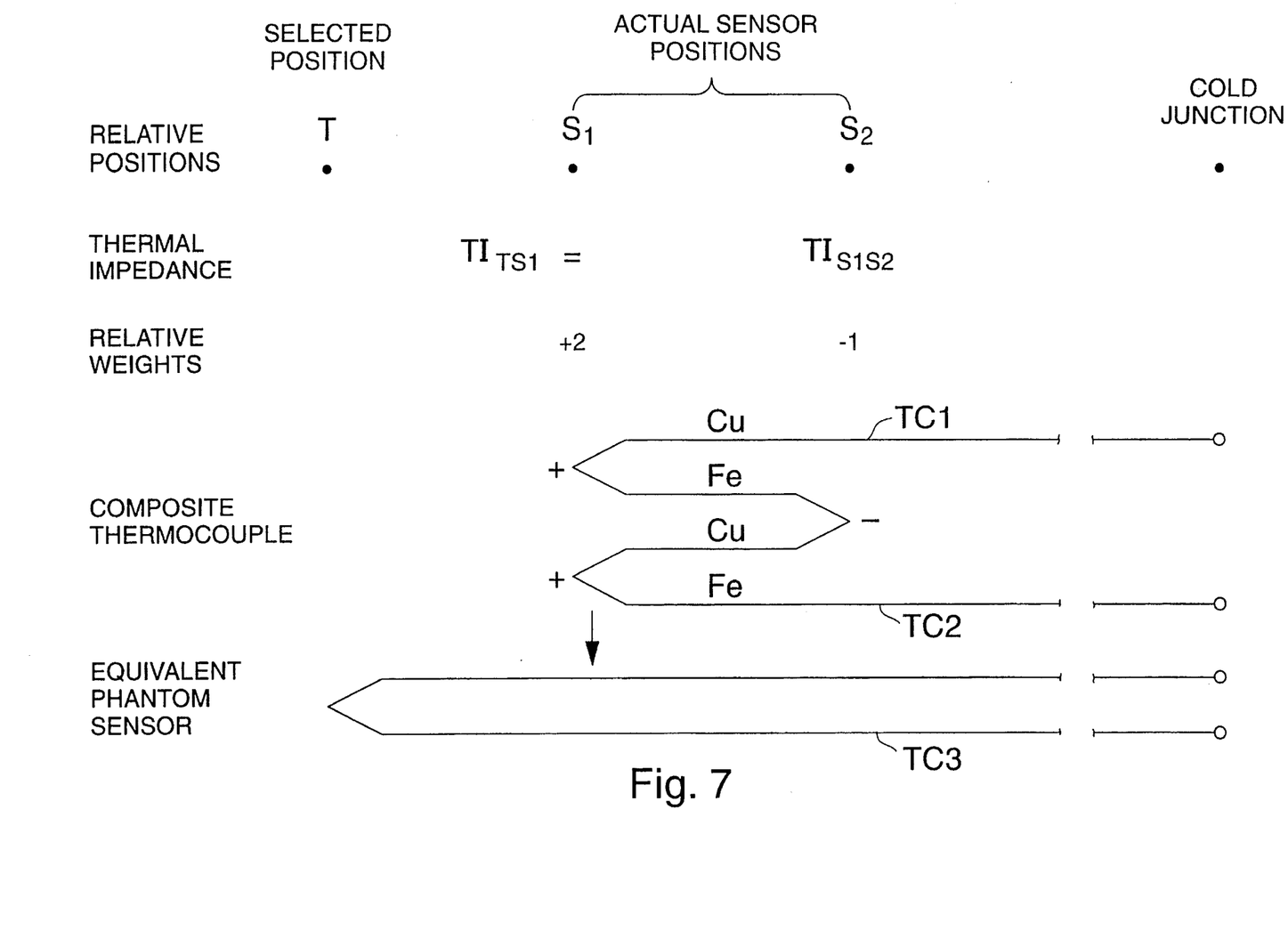
FIG. 7 illustrates arranging thermal impedances in a predetermined ratio to allow the use of integer weighted differences resulting in a signal which acts as an equivalent phantom sensor at a desired position.

Further, by arranging the thermal impedances in certain ratios, the weighted difference can use simple integer coefficients, such as +2, and −1. As illustrated in FIG. 7, the sensors can be thermocouple junctions TC1 and TC2, with two junctions at S2 and one junction at S1. This composite "thermopile" behaves as if there was a single phantom thermocoupled junction TC3 at the extrapolated position S3.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. An apparatus for estimating a cold junction temperature at a screw terminal of a terminal block of an electronic instrument, said electronic instrument including at least one printed circuit board, having a connector for connecting said at least one printed circuit board to said terminal block, said apparatus comprising:

insulating means for insulating said connector and a portion of said at least one printed circuit board to constrain a heat flow across said at least one printed circuit board in a first direction;

first sensor means, located a first distance from said screw terminal in the first direction, for measuring a first temperature;

second sensor means, located a second distance from said screw terminal in the first direction, for measuring a second temperature; and temperature estimating means for dynamically estimating a temperature at said screw terminal from a weighted difference of said first temperature and said second temperature.

2. The apparatus of claim 1, wherein the screw terminal is in a position which is inaccessible for a direct temperature measurement.

3. The apparatus of claim 1, wherein said first and second sensor means include a first and second device respectively, for producing one of a voltage, current, and resistance change as a function of a change in temperature.

4. The apparatus of claim 3, wherein said first device is a first semiconductor pn junction, said second device is a second semiconductor pn junction, and said temperature estimating means includes a resistor network, wherein a gain G1 applied to said first semiconductor pn junction is defined by:

$$G1 = R1*R3/(R1*R3 + R2*R1 + R2*R3),$$

and a gain G2 applied to said second semiconductor pn junction is defined by:

$$G2 = -R1*R2/(R1*R2 + R2*R3 + R3*R1)$$

wherein R1, R2, and R3 constitute the resistor network.

5. The apparatus of claim 4, wherein said first semiconductor pn junction is a first diode and said second semiconductor pn junction is a second diode.

6. The apparatus of claim 4, wherein said first semiconductor pn junction is a first transistor and said second semiconductor pn junction is a second transistor.

7. The apparatus of claim 1, said temperature estimating means including a microprocessor for determining the weighted difference of the first temperature and the second temperature.

8. The apparatus of claim 1, wherein said first sensor means includes at least one thermocouple junction and said second sensor means includes at least one thermocouple junction.

9. The apparatus of claim 8, wherein a first thermal impedance between the at least one thermocouple junction of said first sensor means and the at least one thermocouple junction of said second sensor means and a second thermal impedance between the at least one thermocouple junction of said first sensor means and the screw terminal are selected in a predetermined ratio such that the weighted difference is determined utilizing integer coefficients by connecting the at least one thermocouple junction of said first sensor means and the at least one thermocouple junction of said second sensor means in series.

10. The apparatus of claim 1, wherein said connector is an edge connector.

11. The apparatus of claim 1, wherein said first and second sensors are located on said at least one printed circuit board.

12. The apparatus of claim 1, wherein said insulating means is a trapped air layer.

13. A method for estimating a cold junction temperature at a screw terminal of a terminal block of an electronic instrument, the electronic instrument including at least one printed circuit board, having a connector for connecting the at least one printed circuit board to the terminal block, said method comprising the steps of:

(a) insulating the connector and a portion of the printed circuit board to constrain a heat flow across the printed circuit board in a first direction;

(b) measuring a first temperature at a first distance from the screw terminal in the first direction;

(c) measuring a second temperature at a second distance from the screw terminal in the first direction; and (d) dynamically estimating a temperature at the screw terminal from a weighted difference of the first temperature and the second temperature.

14. The method of claim 13, wherein the screw terminal is in a position which is inaccessible for a direct temperature measurement.

15. An apparatus for estimating a temperature at a selected position comprising:

insulating means for insulating the selected position to constrain a heat flow in a first direction;

first sensor means, located a first distance from the selected position in the first direction, for measuring a first temperature;

second sensor means, located a second distance from the selected position in the first direction, for measuring a second temperature; and temperature estimating means for dynamically estimating the temperature at the selected position from the weighted difference of the first temperature and the second temperature.

16. The apparatus of claim 15, wherein the selected position is a position which is inaccessible for a direct temperature measurement.

17. The apparatus of claim 16, wherein the selected position is a cold junction of an electronic instrument.

18. The apparatus of claim 16, wherein the selected position is a screw terminal, located on a terminal block associated with PCB electronics.

19. The apparatus of claim 16, wherein the selected position is within a vessel.

20. The apparatus of claim 16, wherein the selected position is on an external surface of a probe or sheath.

21. The apparatus of claim 15, wherein said first and second sensor means include a first and second device respectively, for producing one of a voltage, current, and resistance change as a function of a change in temperature.

22. The apparatus of claim 21, wherein said first device is a first semiconductor pn junction, said second device is a second semiconductor pn junction, and said temperature estimating means includes a resistor network, wherein a gain G1 applied to said first semiconductor pn junction is defined by:

$$G1=R1*R3/(R1*R3+R2*R1+R2*R3),$$

and a gain G2 applied to said second semiconductor pn junction is defined by:

$$G2=-R1*R2/(R1*R2+R2*R3+R3*R1)$$

wherein R1, R2, and R3 constitute the resistor network.

23. The apparatus of claim 22, wherein said first semiconductor pn junction is a first diode and said second semiconductor pn junction is a second diode.

24. The apparatus of claim 22, wherein said first semiconductor pn junction is a first transistor and said second semiconductor pn junction is a second transistor.

25. The apparatus of claim 15, said temperature estimating means including a microprocessor for determining the weighted difference of the first temperature and the second temperature.

26. The apparatus of claim 15, wherein said first sensor means, includes at least one thermocouple junction and said second sensor means, includes at least one thermocouple junction.

27. The apparatus of claim 26, wherein a first thermal impedance between the at least one thermocouple junction of said first sensor means and the at least one thermocouple junction of said second sensor means and a second thermal impedance between the at least one thermocouple junction of said first sensor means and the screw terminal are selected in a predetermined ratio such that the weighted difference is determined utilizing integer coefficients by connecting the at least one thermocouple junction of said first sensor means and the at least one thermocouple junction of said second sensor means in series.

28. A method for estimating a temperature at a selected position comprising the steps of:

(a) insulating the desired position to generate a heat flow in a first direction;

(b) measuring a first temperature, at a first distance from the selected position in the first direction;

(c) measuring a second temperature, at a second distance from the selected position in the first direction; and (d) dynamically estimating the temperature at the selected position from a weighted difference of the first temperature and the second temperature.

29. The method of claim 28, wherein the selected position is a position which is inaccessible for a direct temperature measurement.

30. The method of claim 28, wherein the selected position is a cold junction of an electronic instrument.

31. The method of claim 28, wherein the selected position is a screw terminal, located on a terminal block associated with PCB electronics.

32. The method of claim 28, wherein the selected position is within a vessel.

33. The method of claim 28, wherein the selected position is on an external surface of a probe or sheath.

\* \* \* \* \*